(12) United States Patent
Yen et al.

(10) Patent No.: US 12,308,412 B2
(45) Date of Patent: May 20, 2025

(54) BATTERY PACK SYSTEM WITH THERMAL RUNAWAY MITIGATION FEATURES

(71) Applicant: GM Global Technology Operations LLC, Detroit, MI (US)

(72) Inventors: Chih-hung Yen, Bloomfield Hills, MI (US); Taeyoung Han, Bloomfield Hills, MI (US); Bahram Khalighi, Holladay, UT (US); Peter Paul Andruskiewicz, IV, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 11 days.

(21) Appl. No.: 17/745,117

(22) Filed: May 16, 2022

(65) Prior Publication Data
US 2023/0369682 A1    Nov. 16, 2023

(51) Int. Cl.
| | | |
|---|---|---|
| *H01M 10/6595* | (2014.01) | |
| *H01M 10/647* | (2014.01) | |
| *H01M 10/6555* | (2014.01) | |
| *H01M 50/209* | (2021.01) | |
| *H01M 50/211* | (2021.01) | |
| *H01M 50/293* | (2021.01) | |

(52) U.S. Cl.
CPC ..... *H01M 10/6595* (2015.04); *H01M 10/647* (2015.04); *H01M 10/6555* (2015.04); *H01M 50/209* (2021.01); *H01M 50/211* (2021.01); *H01M 50/293* (2021.01); *H01M 2200/10* (2013.01)

(58) Field of Classification Search
CPC .......... H01M 10/6595; H01M 10/647; H01M 10/6555; H01M 2200/10
See application file for complete search history.

(56) References Cited

U.S. PATENT DOCUMENTS

| | | | |
|---|---|---|---|
| 6,942,944 B2* | 9/2005 | Al-Hallaj | H01M 10/651 |
| | | | 429/62 |
| 2017/0165513 A1* | 6/2017 | Li | H01M 10/486 |
| | | (Continued) | |

FOREIGN PATENT DOCUMENTS

| | | | |
|---|---|---|---|
| CN | 110523025 A | * | 12/2019 |
| CN | 111384341 | * | 7/2020 |

(Continued)

OTHER PUBLICATIONS

Machine translation of DE-102010004110-A1 (Year: 2023).*

(Continued)

*Primary Examiner* — Milton I Cano
*Assistant Examiner* — Albert Michael Hilton
(74) *Attorney, Agent, or Firm* — CANTOR COLBURN LLP

(57) ABSTRACT

A battery pack system for inhibiting thermal runaway includes a stack of battery cells wherein each battery cell has a first end, a second end opposite the first end, and side edges extending from the first end to the second end and wherein at least one of the side edges of each battery cell are adjacent to at least one side edge of another of the battery cells, a thermochemical material that undergoes endothermic reaction at temperatures above 50° C., the thermochemical material being located (a) within the stack of battery cells and exterior to battery cells or (b) adjacent to the stack of battery cells, or (c) both.

20 Claims, 4 Drawing Sheets

(56) References Cited

U.S. PATENT DOCUMENTS

| | | | |
|---|---|---|---|
| 2018/0345756 A1* | 12/2018 | He | B60H 1/00885 |
| 2019/0207209 A1* | 7/2019 | Venkatachalam | H01M 4/133 |
| 2019/0256779 A1* | 8/2019 | Muenzenberger | C08K 3/32 |
| 2019/0299812 A1* | 10/2019 | Du | H01M 10/6567 |
| 2020/0153062 A1* | 5/2020 | Collins | H01M 10/6568 |
| 2020/0335839 A1* | 10/2020 | Hekmat | H01M 10/659 |
| 2020/0400386 A1* | 12/2020 | Miers | H01L 23/367 |
| 2021/0104793 A1* | 4/2021 | Parkanzky | H01M 10/6569 |

FOREIGN PATENT DOCUMENTS

| | | | | |
|---|---|---|---|---|
| CN | 112635890 A | * | 4/2021 | A62C 2/04 |
| DE | 102010004110 A1 | * | 7/2011 | H01M 10/0525 |
| EP | 3975317 A1 | * | 3/2022 | A62C 3/08 |
| EP | 3985784 A1 | * | 4/2022 | B64D 41/00 |
| JP | 2019175806 A | * | 10/2019 | |
| WO | WO-2017097958 A1 | * | 6/2017 | B60L 11/187 |
| WO | WO-2019188626 A1 | * | 10/2019 | |

OTHER PUBLICATIONS

Ball, Matthew C., et al. Journal of the Chemical Society, Faraday Transactions 1: Physical Chemistry in Condensed Phases 82.12 (1986): 3709-3715 (Year: 1986).*

Su, W., Darkwa, J., & Kokogiannakis, G. (2015), Renewable and Sustainable Energy Reviews, 48, 373-391 (Year: 2015).*

Machine translation of CN-110523025-A (Year: 2023).*

Machine translation of JP-2019175806-A (Year: 2024).*

Machine translation of DE-102010004110-A1 (Year: 2024).*

Machine translation of CN-112635890-A (Year: 2024).*

Machine translation of CN 111384341 (Year: 2024).*

Machine translation of WO-2019188626-A1 (Year: 2024).*

Cao, J. et al., "Thermochemical heat storage system for prevenitng battery thermal runaway propagation using sodium acetate trihydrate/expanded graphite," Chemical Engineering Journal, vol. 433, Part 2, Apr. 2022; Abstract only.

Li, W. et al., "Efficient thermal management strategy of Li-ion pack based on sorption heat storage," Energy Conversion and Management, vol. 256, No. 4, Mar. 2022; Abstract only.

* cited by examiner

BATTERY PACK SYSTEM WITH THERMAL RUNAWAY MITIGATION FEATURES

INTRODUCTION

The subject disclosure relates to battery pack systems useful in electric vehicles and/or hybrid electric vehicles.

Battery modules can comprise a plurality of battery cells (often called secondary batteries) that are rechargeable. Rechargeable battery cells render them useful in a variety of modern technical applications such as electronic devices, electric bicycles, hybrid cars, electric cars, and the like. Battery modules sometimes undergo unfavorable thermal runaway, where the heat generated by a source (e.g., a battery cell) is greater than the ability of the module to dissipate the heat to its surroundings. This can result in unfavorable temperature increases in the battery module. Thermal runaway can occur, for example, when the battery is short circuited or damaged.

The thermal runaway phenomenon in one battery cell in the battery module may trigger corresponding unfavorable thermal events in adjacent battery cells.

Accordingly, it is desirable to provide a mitigation system to inhibit the spread or propagation of thermal runaway, or quickly quench any thermal runaway.

SUMMARY

In one exemplary embodiment disclosed herein is a battery pack system including a stack of battery cells. Each battery cell has a first end, a second end opposite the first end, and side edges extending from the first end to the second end. At least one of the side edges of each battery cell are adjacent to at least one side edge of another of the battery cells. The battery pack system includes a thermochemical material located within the stack of cells and/or exterior to battery cells and/or adjacent to the stack. The thermochemical material undergoes endothermic reaction at temperatures above 50° C. The thermochemical material is located (a) within the stack of battery cells and exterior to the battery cells or (b) adjacent to the stack of battery cells.

In another exemplary embodiment, disclosed herein is a battery pack system having a battery cell assembly. The system also includes one or more additional feature by which the thermochemical material is provided to the system. That additional feature can include a reservoir containing a thermochemical material and a valve that can release the thermochemical material toward the battery cell assembly upon reaching a threshold level of temperature, pressure or chemical composition. That additional feature can include a gap defined by a first edge of the battery assembly and an interior surface of a framework. That additional feature can include a gas manifold in the framework or adjacent to the framework. Gas from a thermal event in the battery assembly can vent into the gap and/or into the gas manifold and the thermochemical material can be in the framework, on the interior surface of the framework, on an interior surface of the gas manifold or in a region in fluid communication with the gap, or a combination of thereof.

In addition, the battery pack system of the above exemplary embodiments can include one or more of the following features. The battery cells are pouch cells or prismatic cells. The thermochemical material is located between side edges of adjacent battery cells, potentially in a matrix material such as a foam. The battery pack system has a gap defined by the first end and an interior surface of a frame. An interior surface of the frame includes the thermochemical material. The battery pack system includes a reservoir of thermochemical material and one or more valves that can release the thermochemical material upon a predetermined threshold being reached. The predetermined threshold is a temperature, a pressure or a chemical composition of gasses venting from the cells. The stack is divided into two or more mitigation zones each zone having a plurality of the battery cells, a gap between the top end of those cells and the reservoir, and a thermally actuated valve in connection with the reservoir to release the thermochemical material into the zone wherein the two or more mitigation zones are divided from each other by a thermal runaway propagation suppression element. The gap is in fluid communication with a region where the thermochemical material is located. The thermochemical material includes a hydrated salt such as one or more of NaAl(SO4)2·10H2O, Na2B4O7·10H2O, Na2P2O7·10H2O, Al(NO3)2·9H2O, Ba(OH)—2·8H2O, Mg(NO3)2·6H2O, KAl(SO4)2 Al(NO3)2·12H2O, MgCl2·6H2O, and MgSO4·7H2O. The battery pack system further includes a cooling element. The battery pack system further includes a one way valve between the reservoir and a cooling system having a coolant, wherein the one way valve opens to release coolant into the reservoir after opening of the one or more valves.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
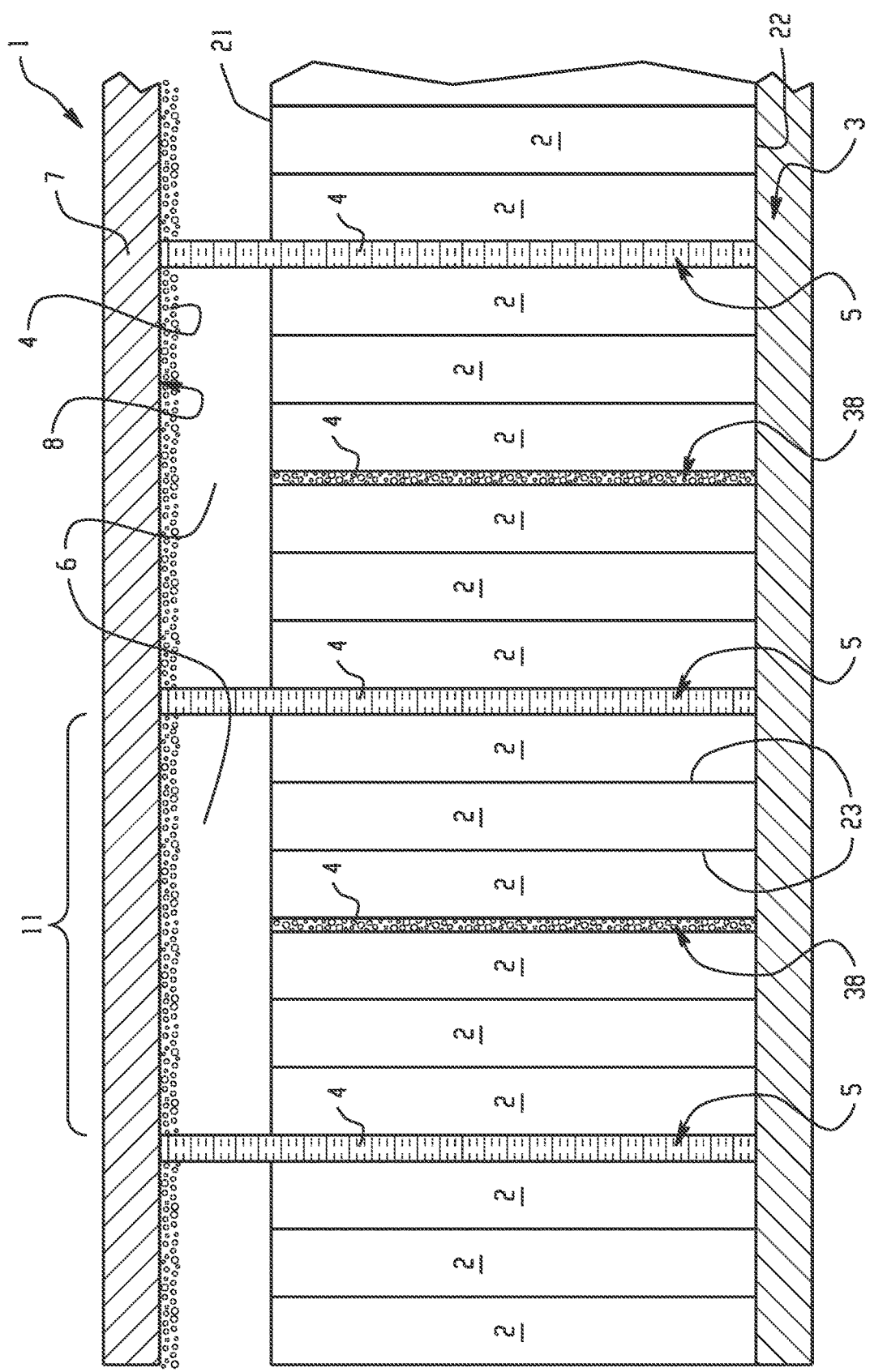
FIG. 1 is a schematic cross sectional view of an exemplary battery pack system including thermochemical material.

The following description is merely exemplary in nature and is not intended to limit the present disclosure, its application or uses. It should be understood that throughout the drawings, corresponding reference numerals indicate like or corresponding parts and features.

The present invention addresses the problem of thermal runaway in a battery pack system by inclusion of a thermochemical material in certain locations in the battery pack system.

Figure 2:
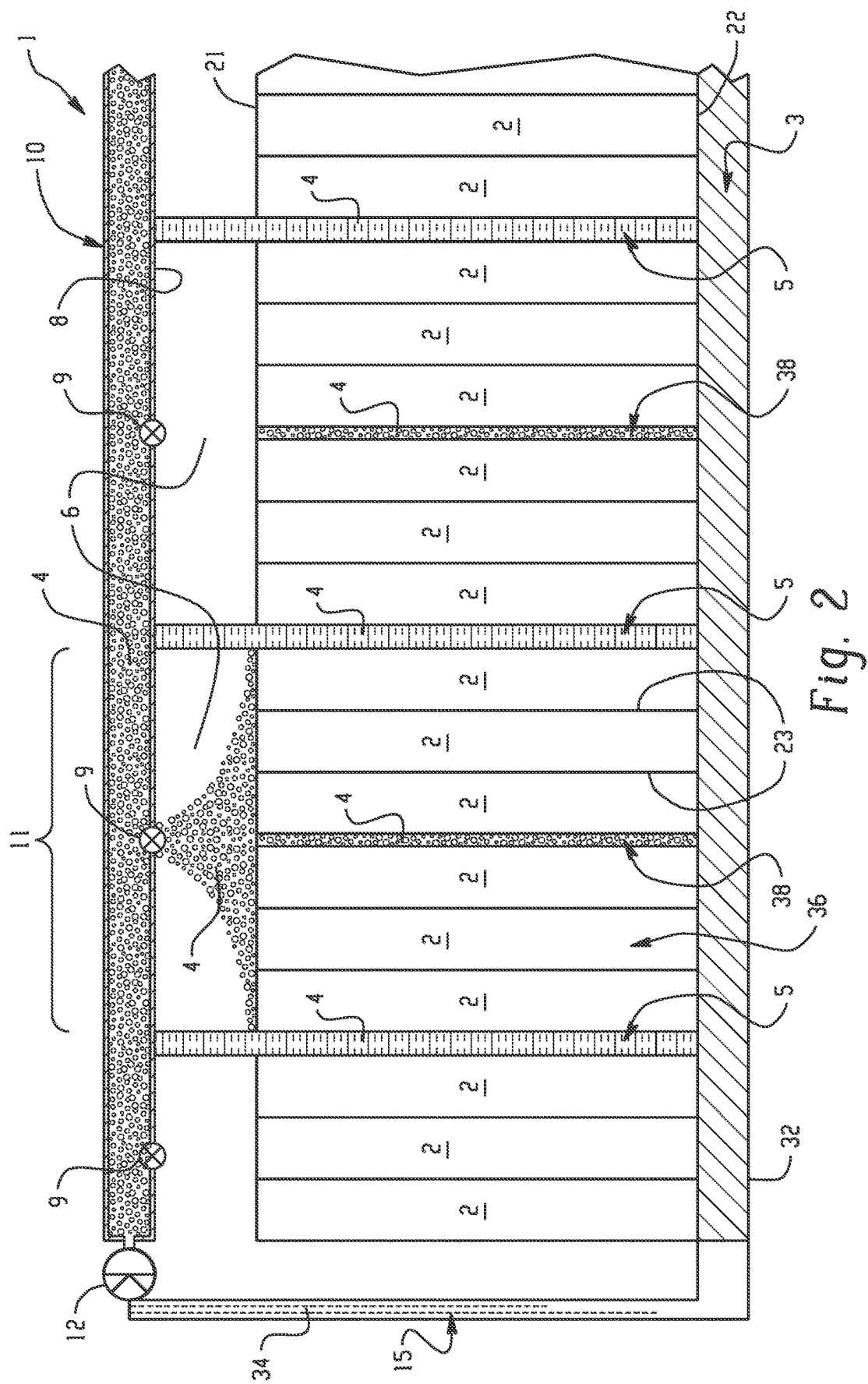
FIG. 2 is a schematic cross sectional view of an exemplary battery pack system including a reservoir of thermochemical material.

In accordance with exemplary aspects and as shown in FIGS. 1, 2, and 3, the battery pack system 1 disclosed herein can comprise battery cells 2 in a stack configuration. For example, the battery cells 2 can be a pouch cell or a prismatic cell. The cells can be stacked such that their maximum dimension is perpendicular to a framework portion 7 and/or to a lower portion 3 as shown in FIG. 1. Each cell can have a first end 21, a second end 22, and side edges 23 extending from the first end 21 to the second end 22. Adjacent battery cells 2 can contact each other at their exterior edges 23. The cells can be stacked such that the side edges are parallel to horizontal (see, e.g., FIG. 3d) or in a structure where the sides edges are parallel to vertical. (See, FIGS. 3a and 3b).

Referring to FIG. 1, the battery pack system 1 can include a framework portion 7. The framework portion 7 can provide structure and/or contain the cells. The framework portion 7 can comprise plastic, composite, or metal sheets or the like. The framework portion 7 can comprise an inner surface 8. A gap 6 can be defined between the inner surface 8 and the first ends 21 of the battery cells 2. The gap 6 can be in fluid communication (e.g., enable gas flow) to a gas manifold 13. As shown, for example in FIG. 3b, 3c, 3d) this gas manifold 13 can include an end portion 31 of the battery pack system 1. The gas manifold 13 can be in or adjacent to the framework portion 7. Note that in an alternative embodiment (not shown in the Figures) there is no gap between the framework portion 7 and the first end 21 of the battery cells 2. The inner surface 8, the gas manifold 13 and/or the end portion 31 can comprise the thermochemical material 4. For example, the thermochemical material can be provided in or on inner surface 8 (e.g. a layer on the surface, deposited in specific regions of the surface or embedded in the surface) or in or on the end portion 31. The thermochemical material can be provided on a solid, porous or lattice structure (not shown) inserted in one or more portions of the gap 6, the gas manifold 13, or end portion 31.

The battery pack system 1 can include a lower portion 3. This lower portion 3 can provide support for the battery cells. In one exemplary aspect, shown in FIG. 2, the lower portion 3 can comprise a cooling element, such as a cooling plate 32. Coolant 34 from a cooling system 15 can run through such cooling plate 32.

Figure 3A:
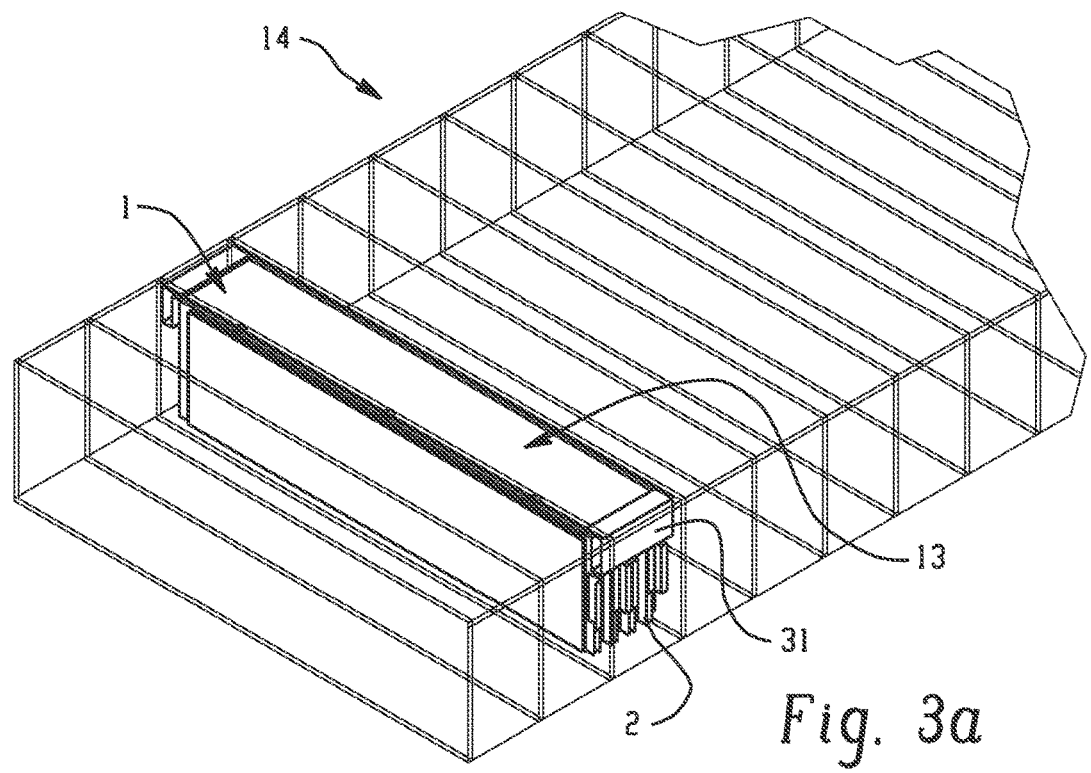
FIG. 3a-3d are schematic views showing exemplary arrangements of battery cells in a pack with venting to regions having thermochemical material.
Figure 3B:
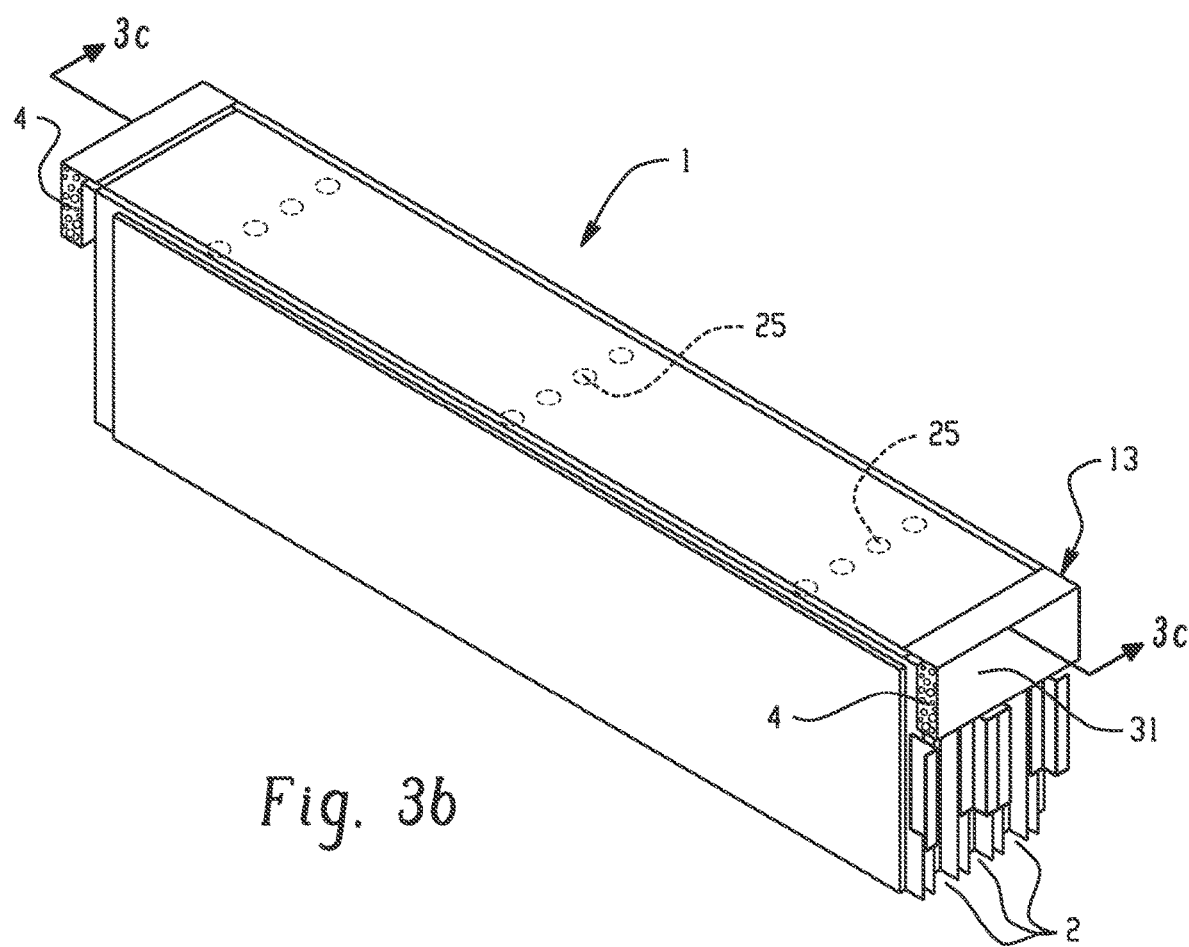
Figure 3C:
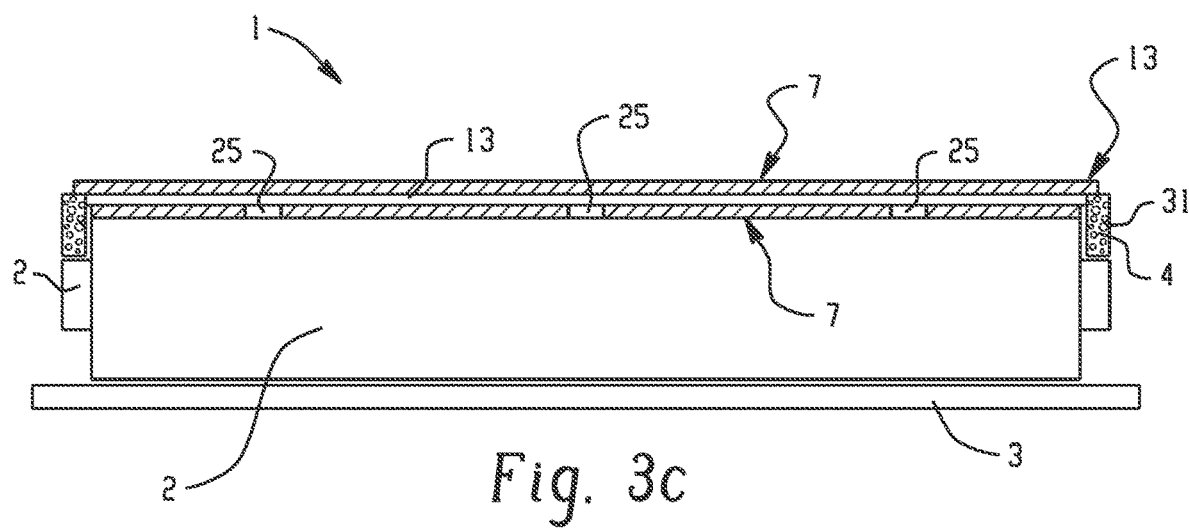
Figure 3D:
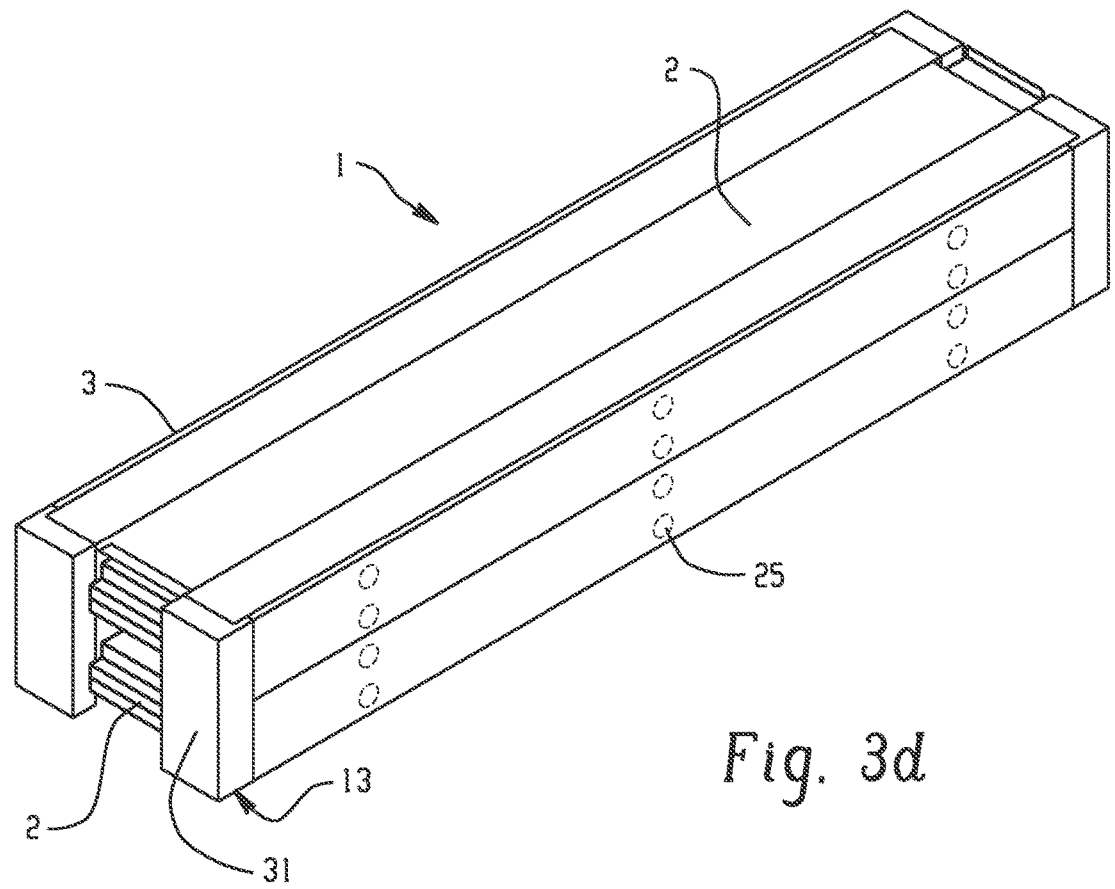

The battery pack system 1 can comprise thermal runaway propagation suppression element 5. As shown if FIGS. 1 and 2, the thermal runaway propagation suppression element 5 can extend from the lower portion 3 to the framework portion 7. Alternatively, the thermal runaway propagation suppression element can extend only to the first end 21 of the battery cells 2. Where a solid, continuous thermal runaway propagation suppression element extends to the framework portion 7, openings 25 may be added to facilitate venting gases to a gas manifold 13 including an end portion 31 (as shown in FIG. 3b, 3c, 3d) or out of the battery pack system. FIG. 3c is a cross-sectional view of FIG. 3b.

A thermal runaway propagation mitigation zone 11 can be defined as a plurality of battery cells 2 located between two thermal runaway propagation suppression elements 5 or between a thermal runaway propagation suppression element 5 and the end of the battery pack 1. The thermal runaway propagation suppression element 5 can comprise a thermally insulating layer. The thermal suppression element 5 can comprise a thermally conductive component extending to the gap 6, the framework 7, and/or the lower portion 3 to conduct heat away from the battery cells 2. When the thermal runaway propagation suppression element 5 comprises both a thermally conductive component and a thermally insulating layer, the thermally conductive component can be located between the thermally insulating layer and the battery cells 2. For example the thermal runaway propagation suppression element 5 could comprise a thermally insulating layer, a heat pipe, or a vapor column between two layers of metal (e.g., metal foil). Optionally, one or more compression layers 38 can also be included in or adjacent to the thermal runaway propagation suppression element 5 or elsewhere in the battery pack (as shown in FIGS. 1 and 2). For example, the thermally insulating layer could also serve as a compression layer. The thermal runaway propagation suppression element 5 can further, optionally comprise the thermochemical material 4 dispersed in or on a surface of the thermal runaway propagation suppression element 5.

The battery pack system 1 can comprise layers 38 between the side edges of two adjacent battery cells 2, between a battery cell 2 and the suppression layer 5, and/or between a battery cell 2 and the outer end framework of the battery pack system. The layers 38 can be compression layers. For example, they can comprise a foamed material such as micro-cellular polyurethane. Alternatively, or in addition to serving as compression layers, the layers 38 can comprise the thermochemical material 4. For example, the thermochemical material 4 can be dispersed within the foamed material of the compression layer 38.

Referring to FIG. 2, the framework portion 7 can define a reservoir 10 for the thermochemical material 4 as well as defining the upper boundary of gap 6. (Again the gap 6 is optional). The reservoir 10 can hold the thermochemical material 4. The reservoir can be at an elevated pressure (e.g., at least 300 or at least 400 kilopascals gauge pressure (kPag) up to 1500 or up to 1200 kPag), which can facilitate emptying of the reservoir upon opening of a valve 9. In this case, the thermochemical material can be in the form of free (e.g. not adhered to or embedded in another layer) small particulate (e.g. powder) that can flow through the valves. Use of small particulates such as powder can maximize surface area to enhance heat absorption. In an alternative embodiment a gas manifold could be adjacent to (e.g., above) the reservoir 10.

Upon occurrence of a thermal event in a cell 36 (overheating cell) and upon reaching a threshold level of a property (e.g. temperature, pressure, chemical composition) one or more valves 9 open as illustrated in FIG. 2 releasing the thermochemical material onto the battery cells 2 and/or into the gap 6. The valves 9 can comprise a material blocking an opening which material melts or deforms at a predetermined temperature (e.g. a temperature above normal battery assembly operating temperature, such as for example, above 50, above 55 or above 60° C. up to 100° C.) thereby releasing thermochemical material. For example, the valves 9 can comprise wax pellets congealed inside spigots, or a contained wax-actuated valve similar to current IC engine flow control thermostats. In another example, the valves 9 may comprise a bimetallic strip that bends out of the path of the opening when heated. Alternatively, the valves 9 can be actuated by the pressure released during a thermal runaway event. As yet another alternative, if gases are released from the cell module, the valves could be actuated by detection of chemical components indicating a thermal runaway event. In this latter alternative, a control unit can be used to actuate the valve.

An optional one way valve 12 can connect to the coolant system 15. The coolant system includes a coolant 34 such as a dielectric heat transfer fluid. During a thermal runaway event, a valve 9 closest to the overheating cell 36 opens, pressure in the reservoir releases thermochemical material 4 into that thermal runaway propagation mitigation zone 11 towards the overheating cell 36. This drops the pressure in the reservoir 10 to near-atmospheric (for example, less than 10 kPag, or 0.1-0.2 kPag) such that pressure in the coolant system 15 will open the one-way valve 12. Coolant 34 can then flow into the reservoir 10, dissolve remaining thermochemical material 4, and can also flow through the open valve 9 towards the overheating cell 36. This can further assist in controlling the thermal runaway due to both the thermochemical material absorbing the heat, and the heat of vaporization of the coolant in the mitigation zone 11.

Once the temperature falls, if valve 9 is actively controlled and sensitive to current conditions (like a thermostat valve) instead of maximum conditions (like a wax plug), it can close and prevent further leakage of coolant to enable some minimal level of continued cooling of the remainder of the battery pack system 1.

The thermochemical material 4 reacts endothermically absorbing energy thereby inhibiting the energy available for the propagation of a thermal runaway in the neighboring cells or module. The thermochemical material 4 can be on or in a layer between or adjacent to the battery cells (such as layer 38, or thermal runaway propagation suppression element 5), on surfaces of a gap 6 adjacent to the battery cells (such as surface 8), on a mesh or screen structure in a gap region, in a gas manifold 13, or in an end region 31, in a reservoir 10 or in a combination of two or more of these locations. The thermochemical material 4 can be a material that is suitable to be provided in these locations.

A reaction that is highly endothermic is more effective at inhibiting thermal runaway by absorbing the energy that would otherwise trigger further events. The thermochemical material 4 should not react at normal operating temperatures for the battery pack system. Thus, the thermochemical material 4 preferably has a reaction initiation temperature of at least 50, at least 60 or at least 70° C., but is thermally stable below those temperatures. At the same time, if the temperature at which the endothermic reaction is initiated is too high, too much damage can occur to the battery pack system 1 before the thermochemical material 4 can function to inhibit the thermal runaway. Thus, the thermochemical material preferably has a reaction initiation temperature of no more than about 120, no more than 105, or no more than 100, or no more than 90° C.

The desired reaction initiation temperature can vary depending upon placement of the thermochemical material 4. For example, a thermochemical material 4 placed only at the end regions of the battery pack system, may desirably have a lower reaction initiation temperature as it is further from the thermal event. Similarly, a thermochemical material 4 placed immediately adjacent (e.g., between side edges of battery cells) may desirably have a higher reaction initiation temperature. Similarly, a thermochemical material 4 disposed on a porous matrix exposed directly to thermal runaway vent gasses may have a higher reaction temperature to be effective due to the temperature of these products of combustion.

The thermochemical material 4 can be, for example, a hydrated salt, hydrated zeolites or metal hydroxides. Hydrated salts can be effective due to high heat storage capability.

For example, hydrated salts with temperatures of dehydration of greater than 50, greater than 55, greater than 60° C. can be used. At the same time, the temperature of dehydration of exemplary hydrated salt can be for example, less than 105, less than 100, less than 90° C. Salts with a large change of heat in dehydration ($\Delta H_{dehydration}$) can enable more energy absorption per unit mass. For example, the $\Delta H_{dehydration}$ can be at least 150, at least 175, or at least 200 kilojoules/kilogram.

Non-binding examples of hydrated salts include $NaAl(SO_4)_2 \cdot 10H_2O$, $Na_2B_4O_7 \cdot 10H_2O$, $Na_2P_2O_7 \cdot 10H_2O$, $Al(NO_3)_2 \cdot 9H_2O$, $Ba(OH)_2 \cdot 8H_2O$, $Mg(NO_3)_2 \cdot 6H_2O$, $KAl(SO_4)_2$ $Al(NO_3)_2 \cdot 12H_2O$, $MgCl_2 \cdot 6H_2O$, and $MgSO_4 \cdot 7H_2O$.

The thermochemical material 4, preferably, is not reactive with other components in the battery pack system to which the thermochemical material is exposed. For example, a thermochemical material 4 with a substantially neutral pH (e.g. pH of 6-8) can be used. The thermochemical material 4 can be non-conductive or minimally-conductive. Where a reservoir 10 is used and coolant 34 is combined with the thermochemical material 4, the thermochemical material 4 desirably does not make the coolant significantly more conductive. Also, the thermochemical material 4 desirably does not reduce into compounds more toxic than the electrolyte and other battery internals during a thermal event, and contains minimal oxygen to limit additional oxidation interactions during a thermal runaway event.

The battery pack system 1 can include other features beyond the enclosure, physical structure, thermal runaway mitigation features, and the cells themselves. These can include a thermal management and cooling system for normal operation to keep the battery cells in their ideal temperature range and to remove excess heat, electrical bussing to combine the cells in parallel and series to meet the voltage and current demands of a vehicle, voltage management systems to maintain overall pack capability by balancing the voltage and capacity across parallel cell groups, and a battery disconnect unit that provides control over the battery system charge, discharge, and electrical connections to propulsion, charging, and other vehicle subsystems. As shown in FIG. 3a-3d, the battery packs 1 as shown in FIGS. 1 and 2 can be combined in an assembly structure 14 in either vertical (FIGS. 3b and 3c) or horizontal (FIG. 3d) orientation.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure is not limited to the particular embodiments disclosed, but will include all embodiments falling within the scope thereof.

What is claimed is:

1. A battery pack system comprising
    a stack of battery cells wherein each battery cell has a first end, a second end opposite the first end, and side edges extending from the first end to the second end and wherein at least one of the side edges of each battery cell are adjacent to at least one side edge of another of the battery cells,
    a gap defined by the first end and an inner surface of a frame where the gap separates the stack of battery cells from a thermochemical material,
    a cooling system which releases a coolant into the gap through a one-way valve upon a predetermined threshold being reached, and
    the thermochemical material is a hydrated salt or hydrated zeolite that undergoes endothermic dehydration reaction at temperatures above 50° C. and that has a $\Delta H_{dehydration}$ of at least 150 kilojoules/kilogram,
    wherein the thermomechanical material (a) is deposited as a layer on the inner surface of the frame, (b) is embedded in the inner surface of the frame, (c) is adhered or embedded in a portion of a gas manifold, wherein the gas manifold is in fluid communication with the gap, or (d) is deposited as a layer on or is embedded in a solid, porous, or lattice structure inserted into the gas manifold.

2. The battery pack system of claim 1 wherein the thermochemical material undergoes endothermic reaction at temperatures between 60 and 100° C.

3. The battery pack system of claim 1 wherein the battery cells are pouch cells or prismatic cells.

4. The battery pack system of claim 1 wherein the stack comprises one or more layers located between side edges of adjacent battery cells wherein the one or more layers comprise the thermochemical material.

5. The battery pack system of claim 1 wherein the thermochemical material in the one or more layers is dispersed in a matrix material.

6. The battery pack system of claim 5 wherein the matrix material is a foam.

7. The battery pack system of claim 1 wherein the thermochemical material is deposited as a layer on the inner surface of the frame or is embedded in the inner surface of the frame.

8. The battery pack system of claim 1 wherein the hydrated salt comprises one or more of $NaAl(SO_4)_2 \cdot 10H_2O$, $Na_2P_2O_7 \cdot 10H_2O$, $Al(NO_3)_2 \cdot 9H_2O$, $Ba(OH)_2 \cdot 8H_2O$, $Mg(NO_3)_2 \cdot 6H_2O$, $KAl(SO_4)_2$, $Al(NO_3)_2 \cdot 12H_2O$, $MgCl_2 \cdot 6H_2O$, and $MgSO_4 \cdot 7H_2O$.

9. The battery pack system of claim 1 further comprising a cooling element.

10. The battery pack system of claim 1 wherein the thermochemical material comprises a hydrated zeolite.

11. The battery pack system of claim 1 wherein the frame defines a reservoir having one or more valves that open to the gap upon a predetermined threshold being reached and a one way valve between the reservoir and the one way valve opens to release coolant into the reservoir after opening of the one or more valves.

12. A battery pack system comprising
a stack of battery cells wherein each battery cell has a first end, a second end opposite the first end, and side edges extending from the first end to the second end and wherein at least one of the side edges of each battery cell are adjacent to at least one side edge of another of the battery cells,
a gap defined by the first end and an inner surface of a frame wherein the frame defines a reservoir extending adjacent the stack of battery cells wherein the reservoir is separated from the stack of battery cells by the gap,
particulates comprising a thermochemical material that is a hydrated salt or hydrated zeolite that undergoes endothermic dehydration reaction at temperatures above 50° C., wherein the particulates comprising the thermochemical material are located in the reservoir having one or more valves that can release the particulates comprising the thermochemical material into the gap toward the battery cells and/or onto the battery cells upon a predetermined threshold being reached,
wherein there is a one way valve between the reservoir and a cooling system comprising a coolant, wherein the one way valve opens to release coolant into the reservoir after opening of the one or more valves.

13. The battery pack system of claim 12 wherein the predetermined threshold is a temperature, a pressure or a chemical composition of gasses venting from the cells.

14. The battery pack system of claim 12 wherein the stack is divided into two or more mitigation zones divided from each other by a thermal runaway propagation suppression element each zone comprising a plurality of the battery cells, a gap between the first end of the cells and the reservoir, and a valve in connection with the reservoir, wherein, upon occurrence of a thermal event in one of the zones, the valve releases the particulates comprising the thermochemical material into the gap of the zone wherein the thermal event has occurred.

15. The battery pack system of claim 12 wherein, in addition to the particulates comprising the thermochemical material in the reservoir, the thermochemical (a) is deposited as a layer on the inner surface, (b) is embedded in the inner surface, (c) is located between side edges of adjacent battery cells, (d) adhered or embedded in a portion of a gas manifold, wherein the gas manifold is in fluid communication with the gap, or € is deposited as a layer on or is embedded in a solid, porous, or lattice structure inserted into the gap or inserted into the gas manifold, or a combination thereof.

16. The battery back system of claim 12 wherein the thermochemical material has a $\Delta H_{dehydration}$ of at least 150 kilojoules/kilogram.

17. The battery pack system of claim 12 wherein the hydrated salt comprises one or more of $NaAl(SO_4)_2 \cdot 10H_2O$, $Na_2P_2O_7 \cdot 10H_2O$, $Al(NO_3)_2 \cdot 9H_2O$, $Ba(OH)_2 \cdot 8H_2O$, $Mg(NO_3)_2 \cdot 6H_2O$, $KAl(SO_4)_2$, $Al(NO_3)_2 \cdot 12H_2O$, $MgCl_2 \cdot 6H_2O$, and $MgSO_4 \cdot 7H_2O$.

18. The battery pack system of claim 12 wherein the thermochemical material comprises a hydrated zeolite.

19. The battery pack system of claim 12 wherein the thermochemical material undergoes endothermic reaction at temperatures between 60 and 100° C.

20. The battery pack system of claim 12 wherein the battery cells are pouch cells or prismatic cells.

* * * * *